United States Patent
Mura et al.

(10) Patent No.: US 10,938,260 B2
(45) Date of Patent: Mar. 2, 2021

(54) ELECTRICAL INSULATING STRUCTURE PRODUCING METHOD, ELECTRICAL INSULATING STRUCTURE AND ROTATING ELECTRICAL MACHINE

(71) Applicant: TOSHIBA MITSUBISHI-ELECTRIC INDUSTRIAL SYSTEMS CORPORATION, Chuo-ku (JP)

(72) Inventors: Kotaro Mura, Tokyo (JP); Shinsuke Kikuta, Tokyo (JP); Toshihiro Tsuda, Tokyo (JP); Tetsuo Yoshimitsu, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 113 days.

(21) Appl. No.: 16/227,956

(22) Filed: Dec. 20, 2018

(65) Prior Publication Data

US 2019/0149010 A1    May 16, 2019

Related U.S. Application Data

(63) Continuation of application No. PCT/JP2016/003163, filed on Jul. 1, 2016.

(51) Int. Cl.
*H02K 15/00*  (2006.01)
*H02K 3/40*  (2006.01)
(Continued)

(52) U.S. Cl.
CPC ............... *H02K 3/40* (2013.01); *H01B 13/00* (2013.01); *H01B 17/62* (2013.01); *H01B 19/02* (2013.01);
(Continued)

(58) Field of Classification Search
CPC ........ H01B 19/04; H01B 19/02; H01B 17/62; H01B 13/00; H02K 7/083; H02K 3/40;
(Continued)

(56) References Cited

U.S. PATENT DOCUMENTS 3,902,087 A * 8/1975 Hakamada ........... C08G 18/003
                                                    310/211
4,806,806 A * 2/1989 Hjortsberg ............. H02K 15/12
                                                     310/45
(Continued)

FOREIGN PATENT DOCUMENTS

EP    2 808 981 A2    3/2014
JP    63-110929 A     5/1988
(Continued)

OTHER PUBLICATIONS

International Search Report dated Aug. 2, 2016 in PCT/JP2016/003163 filed Jul. 1, 2016.
(Continued)

*Primary Examiner* — Naishadh N Desai
(74) *Attorney, Agent, or Firm* — Xsensus LLP

(57) ABSTRACT

A producing method is for an electrical insulating structure to cover an outer surface of a to-be-insulated object. The method comprises: a tape production step of producing a main insulation tape by using a nanoparticle-containing joining macromolecular polymer; a taping step of winding a main insulation tape on outside of the to-be-insulated object to form a main insulated part; a vacuum drawing step, which is performed after the taping step, of vacuum drawing the tape-wound to-be-insulated object; and an impregnation step, which is performed after the vacuum drawing step, of injecting a impregnating macromolecular polymer to impregnate the main insulated part therewith.

5 Claims, 16 Drawing Sheets

(51) Int. Cl.
*H02K 3/30* (2006.01)
*H02K 15/12* (2006.01)
*H01B 13/00* (2006.01)
*H01B 17/62* (2006.01)
*H01B 19/02* (2006.01)
*H01B 19/04* (2006.01)
*H02K 7/08* (2006.01)
*H02K 15/10* (2006.01)

(52) U.S. Cl.
CPC ............... *H01B 19/04* (2013.01); *H02K 3/30* (2013.01); *H02K 7/083* (2013.01); *H02K 15/105* (2013.01); *H02K 15/12* (2013.01)

(58) Field of Classification Search
CPC .......... H02K 15/10; H02K 15/12; H02K 7/08; H02K 3/30; H02K 15/105
See application file for complete search history.

(56) References Cited

U.S. PATENT DOCUMENTS

2005/0208301 A1\* 9/2005 Okamoto ............... H01B 3/006
 428/402
2015/0101845 A1 4/2015 Groppel et al.
2016/0247595 A1\* 8/2016 Song ..................... C09J 7/20

FOREIGN PATENT DOCUMENTS

| JP | 10-174333 | 6/1998 |
| WO | WO 2015/053374 A1 | 4/2015 |
| WO | WO 2016/104141 A1 | 6/2016 |

OTHER PUBLICATIONS

Extended European Search Report dated Feb. 5, 2020 in European Application No. 16907206.3.

\* cited by examiner

Longitudinal direction of laminated conductor

Longitudinal direction of laminated conductor

Longitudinal direction of laminated conductor

ELECTRICAL INSULATING STRUCTURE PRODUCING METHOD, ELECTRICAL INSULATING STRUCTURE AND ROTATING ELECTRICAL MACHINE

CROSS-REFERENCES TO RELATED APPLICATIONS

The present application is a continuation application of International Application No. PCT/JP2016/003163 filed on Jul. 1, 2016, the entire content of which is incorporated herein by reference.

BACKGROUND OF THE INVENTION

The present invention relates to an electrical insulating structure producing method, an electrical insulating structure, and a rotating electrical machine.

When an unequal electric field portion occurs due to application of an electric field to an insulator, and the electric field at that portion exceeds an insulation-breakdown limit voltage, a local breakdown is caused there. When the local breakdown progresses dendritically, an electric tree is generated. The electric tree is believed to be generated by starting from a high electric field concentration parts such as foreign matters, an air gap between an electrode and the insulator, foreign matters, projections and voids in the insulator.

In recent years, the use of inverters have been prevailing. In an inverter-driven motor, the lifetime of an insulating material of a coil conductive wire may be significantly reduced when the motor is used in a state where an impulse voltage including inverter surge repeatedly acts. Therefore, for example, such situation occurs, in which insulation for normal rated voltage 6.6 kV is forced to be used for an inverter-driven motor for rated voltage 3.3 kV.

As an example of an electrical insulating structure for a conductor used in a rotating electrical machine, a coil conductor is typically covered with an insulator having an insulating material. Such a conductor easily reaching high temperatures often has a mica electrical insulating structure using mica which is a kind of silicate minerals as an insulating material of high insulation class capable of withstanding comparatively high temperatures.

When the electric tree progresses, the mica electrical insulating structure may be broken. To understand how the electric tree is generated and how it progresses is extremely important to prevent generation and progress of the electric tree and to maintain the integrity of the rotating electrical machine.

As for the integrity of the insulating material, for example, IEC (International Electrotechnical Commission) is preparing for enactment of international standards prescribing a new insulation test method for accident prevention.

Patent Document 1: U.S. Published Application No. 2015/0101845-A1

For example, the insulation lifetime of a formed-wound electrical motor for high voltage is significantly influenced by a main insulation and a turn insulation which are disposed inside a stator core. In such main insulations and turn insulations, the mica electrical insulating structure is often used.

Further, the mica electrical insulating structure as the main insulation is formed, in most cases, by impregnating a mica insulating tape with epoxy resin. The mica insulating tape is composed of mica and an epoxy glass layer. The mica insulating tape thus configured is wound around a coil conductor and then impregnated with the epoxy resin, whereby insulation treatment by the mica electrical insulating structure is performed (Refer to Patent document 1).

It was experimentally confirmed that the path of the electric tree in the thus configured mica electrical insulating structure did not penetrate a mica insulating layer but was formed on the epoxy glass layer side outside the mica insulating layer. That is, a weak point in the main insulation was found to exist in the epoxy glass layer.

SUMMARY OF THE INVENTION

The present invention has been made based on the above findings, and an object thereof is to suppress the progress of the electric tree in the electrical insulating structure.

According to the present invention, there is provided a producing method for an electrical insulating structure that covers an outer surface of a to-be-insulated object, the method comprising: a tape production step of producing a main insulation tape by using a nanoparticle-containing joining macromolecular polymer; a taping step of winding a main insulation tape on outside of the to-be-insulated object to form a main insulated part; a vacuum drawing step, which is performed after the taping step, of vacuum drawing the tape-wound to-be-insulated object; and an impregnation step, which is performed after the vacuum drawing step, of injecting a impregnating macromolecular polymer to impregnate the main insulated part therewith.

According to the present invention, there is provided an electrical insulating structure that covers an outer surface of a to-be-insulated object to electrically insulate the to-be-insulated object, the structure comprising: a main insulation layer extending along a surface of the to-be-insulated object; a fiber reinforcement part extending along the main insulation layer; and a macromolecular polymer part formed in the fiber reinforcement part so as to join the main insulation layer and the fiber reinforcement part, wherein nanoparticles are scattered in the macromolecular polymer part with the highest concentration in the fiber reinforcement part.

According to the present invention, there is provided a rotating electrical machine comprising: a rotor including an axially extending rotor shaft and a rotor core attached to radially outside the rotor shaft; a stator including a hollow cylindrical stator core disposed radially outside the rotor core so as to be spaced therefrom and stator winding conductors provided in a plurality of slots formed along an inner surface of the stator core with circumferential intervals therebetween and extending up to axial both ends of the stator core and axially outside the stator core; two bearings rotatably supporting the rotor shaft at both axial sides of the rotor shaft with the stator core axially sandwiched therebetween; a frame housing the rotor core and the stator therein; and an electrical insulating structure applied to the stator winding conductors so as to electrically insulate the stator winding conductors, wherein the electrical insulating structure includes: a main insulation layer extending along a surface of the to-be-insulated object; a fiber reinforcement part extending along the main insulation layer; and a macromolecular polymer part formed in the fiber reinforcement part so as to join the main insulation layer and the fiber reinforcement part, wherein nanoparticles are scattered in the macromolecular polymer part with the highest concentration in the fiber reinforcement part.

DESCRIPTION OF THE EMBODIMENTS

Hereinafter, with reference to the accompanying drawings, electrical insulating structure producing methods, electrical insulating structures, and rotating electrical machines according to embodiments of the present invention will be described. The same or similar portions are represented by the same reference symbols and will not be described repeatedly.

The followings exemplify the cases where an electrical insulating structure is applied to stator winding conductors of a rotating electrical machine, to-be-insulated objects or the objects to be insulated are not limited to the stator winding conductors. That is, it is applicable to any conductors as long as they have a structure where its outer surface is covered by the electrical insulating structure.

First Embodiment

Figure 1:
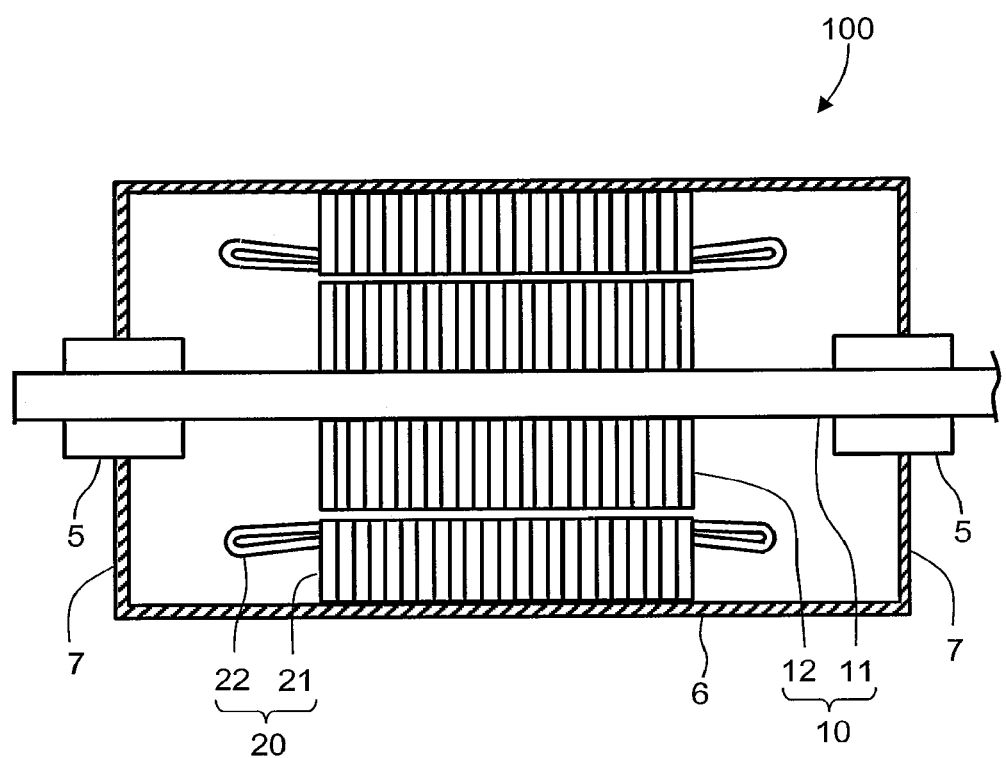
FIG. 1 is a sectional longitudinal view illustrating the configuration of a rotating electrical machine according to a first embodiment.

FIG. 1 is a sectional longitudinal view illustrating the configuration of a rotating electrical machine according to a first embodiment. A rotating electrical machine 100 has a rotor 10, a stator 20, a frame 6 surrounding the radially outside of the rotor 10 and the stator 20, and bearing brackets 7 attached to both axial ends of the frame 6.

The rotor 10 has a rotor shaft 11 extending in its longitudinal direction and a rotor core 12 attached to radially outside the rotor shaft 11. The rotor shaft 11 is rotatably supported at both axial sides thereof by bearings 5. Each of the bearings 5 is stationarily supported by each of the bearing brackets 7.

The stator 20 has a stator core 21 disposed radially outside the rotor core 12 so as to be spaced therefrom and stator windings 22 penetrating inside the stator core 21.

A plurality of stator slots (not illustrated) are formed along the inner surface of the stator core 21 with circumferential intervals therebetween and extend up to axially both ends of the stator core 21. Conductors 24 (FIG. 2) for the stator winding 22 are disposed in each stator slot.

Figure 2:
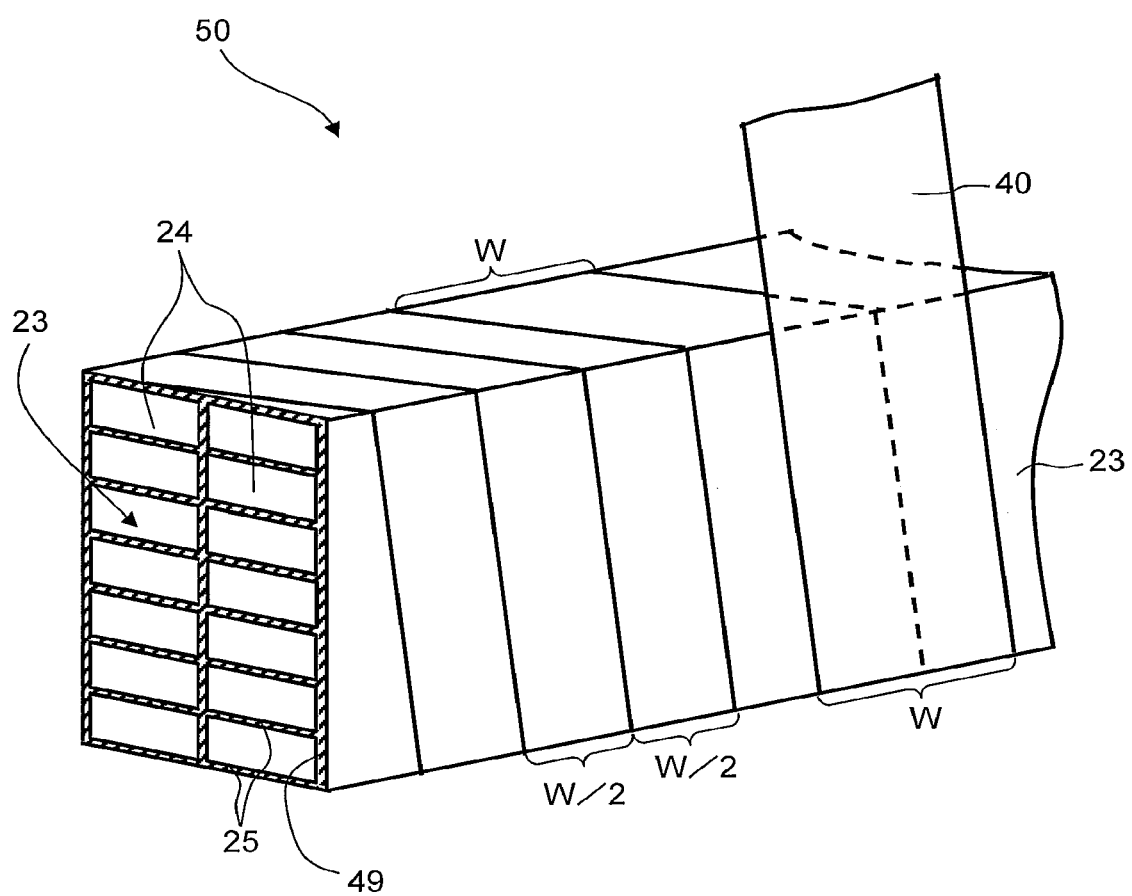
FIG. 2 is a perspective view for explaining an electrical insulating structure and a tape-wound conductor according to the first embodiment.

FIG. 2 is a perspective view for explaining an electrical insulating structure and a tape-wound conductor according to the first embodiment.

The plurality of stator winding conductors 24 constituting the stator winding 22 form a laminated conductor 23. Specifically, seven conductors 24 are arranged in one column and two columns form the laminated conductor 23 by fourteen conductors 24 in total. The number of laminated layers and the number of columns mentioned here are merely illustrative, and any number of the conductors 24 may be arranged in one or three or more columns. Each stator winding conductor 24 is applied with a turn insulation 25 provided outside thereof. Accordingly, the outer surface of the laminated conductor 23 is covered by the turn insulation 25.

A main insulation tape 40 serving as a main insulation is wound outside the laminated conductor 23 applied with the turn insulation 25 to form a main insulated part 49 outside the laminated conductor 23, whereby a tape-wound conductor 50 is obtained.

The width of the main insulation tape 40 is assumed to be W. The main insulation tape 40 is helically wound as viewed in the longitudinal direction of the laminated conductor 23. A winding method in this case is a half-wrap method. Specifically, the helical pitch is W/2 which is half the width W of the main insulation tape 40. In other words, the main insulation tape 40 is wound so as to overlap, by half the width, the main insulation tape 40 of the previous turn. However, the winding method is not limited to the half-wrap method. For example, the width of the overlap may be changed. Further, the main insulation tape 40 may be wound such that adjacent ones are positioned without any space between them. In this case, in second winding or in winding secondly, the main insulation tape 40 is wound shifted in the longitudinal direction by half of the width thereof.

After finishing the first winding of the main insulation tape 40 in the longitudinal direction of the laminated conductor 23, the second winding is performed on the first winding, to produce a layered structure of the main insulation tape 40. The number of times of the winding of the main insulation tape 40 is not limited to two and may be three or more or one and is determined according to insulating performance required.

Meanwhile, there may be a case where the stator winding conductors 24 are individually applied with insulation treatment and mica insulation treatment is applied outside the insulated stator winding conductors 24.

Figure 3:
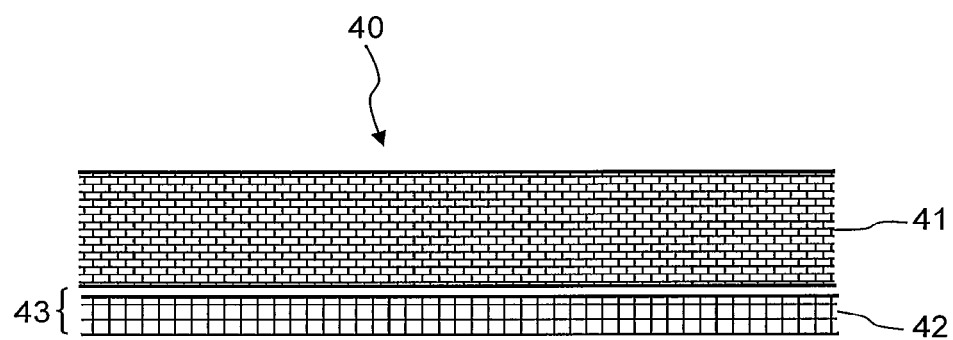
FIG. 3 is a sectional longitudinal view schematically illustrating the configuration of the main insulation tape of the electrical insulating structure according to the first embodiment.

FIG. 3 is a sectional longitudinal view schematically illustrating the configuration of the main insulation tape of the electrical insulating structure according to the first embodiment. The main insulation tape 40 constituting the electrical insulating structure 30 has a main insulation layer 41, a fiber reinforcement part 42, and a nanoparticle-containing joining macromolecular polymer 43 that permeates the fiber reinforcement part 42 and functions to join the fiber reinforcement part 42 and the main insulation layer 41. The main insulation layer 41 basically performs insulating function. The fiber reinforcement part 42 supports the main insulation layer 41 therealong to secure the strength of the main insulation tape 40.

The material of the main insulation layer 41 is, e.g., mica, asbestos, porcelain, or the like. The material of the fiber reinforcement part 42 is, e.g., glass fiber or the like, and is generally woven in a mesh pattern. The nanoparticle-containing joining macromolecular polymer 43 is, e.g., unsaturated polyester resin or epoxy resin.

The thickness of the main insulation layer 41 is, e.g., about 100 μm. The thickness of the fiber reinforcement part 42 is smaller than that of the main insulation layer 41 and is, e.g., about 30 μm. While the fiber reinforcement part 42, the nanoparticle-containing joining macromolecular polymer 43, and the main insulation layer 41 are illustrated as the constituent elements of the main insulation tape 40 in FIG. 3, the nanoparticle-containing joining macromolecular polymer 43 is impregnated into the fiber reinforcement part 42 and joins the main insulation layer 41 and the fiber reinforcement part 42. Thus, a part constituted of only the nanoparticle-containing joining macromolecular polymer 43 has nearly no thickness, so that typically the main insulation layer 41 and the fiber reinforcement part 42 is almost in contact with each other.

The nanoparticle-containing joining macromolecular polymer 43 has been kneaded with nanoparticles. Examples of the nanoparticle include silicon dioxide ($SiO_2$), aluminum oxide ($Al_2O_3$) magnesium oxide (MgO), boron nitride (BN), and carbon nanotube (CNT).

Generally, the nanoparticles are said to include particles having a diameter of up to about 100 nm. The nanoparticles used in the present embodiment are assumed to be particles having a diameter of 100 nm or less, i.e., about several tens of nm. It is considered that the following effects cannot be obtained if particles having a diameter of about several hundreds of nm exceeding 100 nm are used.

Particles having a diameter of 100 nm or less may be produced by chemical growth from finer ones. Alternatively, particles having a diameter exceeding 100 nm may be pulverized to produce particles having a diameter of 100 nm or less. Further, surface modification may be applied so as to prevent particle aggregation in the nanoparticle-containing joining macromolecular polymer 43.

Hereinafter, a particle having a diameter of 100 nm or less is referred to as a nanoparticle.

The main insulating tape 40 is wound, with the main insulating layer 41 facing the to-be-insulated object, and with the fiber-reinforcement part 42 facing outside.

Figure 4:
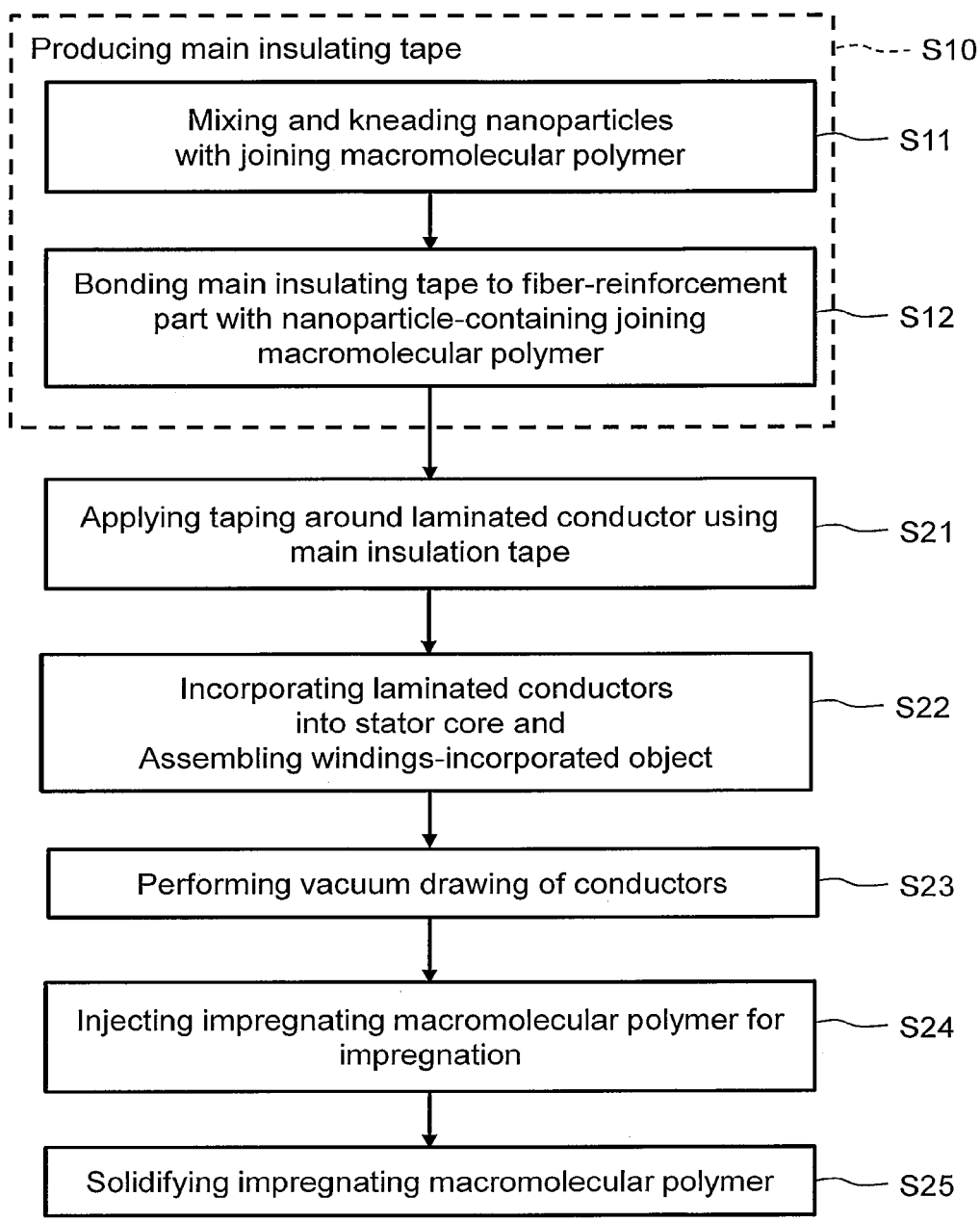
FIG. 4 is a flowchart illustrating the procedure of an electrical insulating structure producing method according to the first embodiment.

FIG. 4 is a flowchart illustrating the procedure of an electrical insulating structure producing method according to the first embodiment.

First, the main insulating tape 40 is produced (Step S10). More specifically, nanoparticles are mixed and kneaded with a joining macromolecular polymer, or macromolecular polymer for bonding (Step S11). That is, the nanoparticles are mixed and kneaded with the joining macromolecular polymer, thereby preparing a nanoparticle-containing joining macromolecular polymer 43 that is used for bonding and contains nanoparticles.

Figure 5:
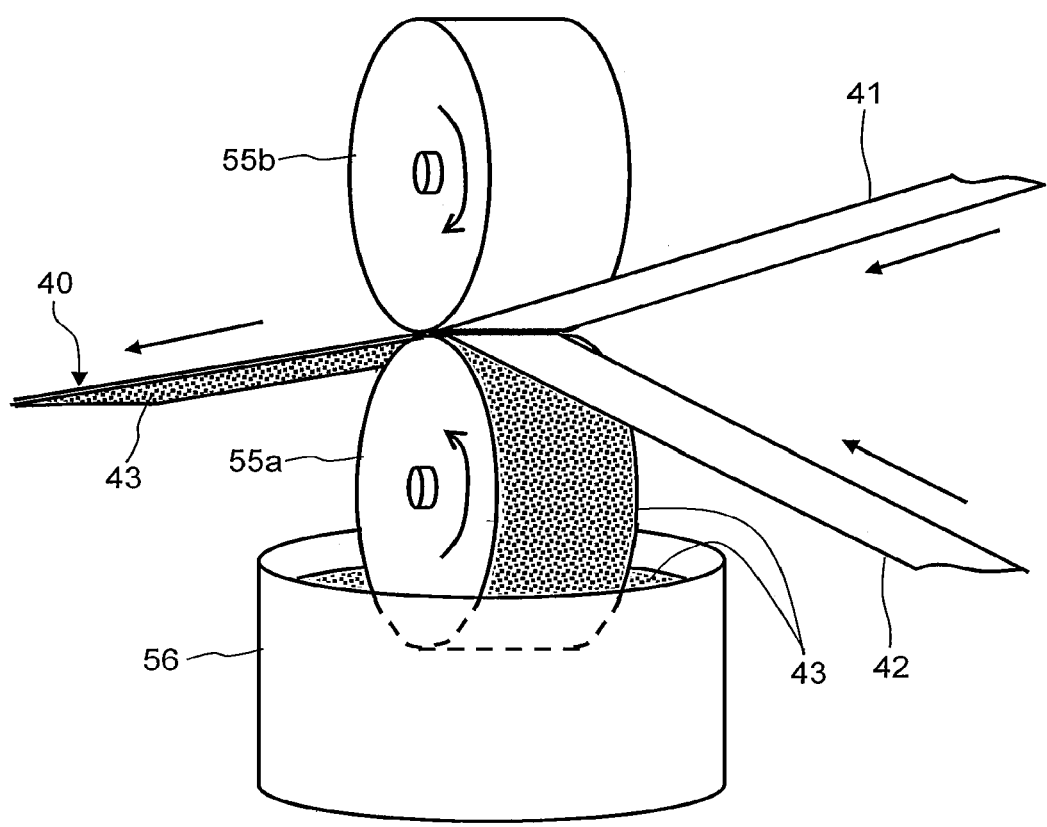
FIG. 5 is a perspective view illustrating a state of main insulation tape producing step in the electrical insulating structure producing method according to the first embodiment.

FIG. 5 is a perspective view illustrating a state of main insulation tape producing step in the electrical insulating structure producing method according to the first embodiment. That is, FIG. 5 shows the state of the step (Step S12) for bonding the main insulating tape 41 to the fiber-reinforcement part 42 by using the nanoparticle-containing joining macromolecular polymer 43.

The main insulating tape 41 and the fiber-reinforcement part 42 are fed, placing the former above the latter. Then, they are laid one on the other, while pinched between a lower roller 55a and an upper roller 55b.

A bonding agent container 56, which opens at the top, stores the nanoparticle-containing joining macromolecular polymer 43. The lower roller 55a has its lower part immersed in the nanoparticle-containing joining macromolecular polymer 43 stored in the bonding agent container 56. When the lower roller 55a is rotated, the nanoparticle-containing joining macromolecular polymer 43 sticks to the surface of the roller 55a. The nanoparticle-containing joining macromolecular polymer 43 sticking to the surface of the roller 55a moves, in part, to the fiber-reinforcement part 42, at the position facing the upper roller 55b.

Therefore, the nanoparticle-containing joining macromolecular polymer 43 applied to the fiber-reinforcement part 42 from underside thereof enters the fiber-reinforcement part 42 and reaches the main insulating layer 41. The nanoparticle-containing joining macromolecular polymer 43 that have reached the main insulating layer 41 bonds the fiber-reinforcement part 42 and the main insulation layer 41 together.

Next, the main insulating tape 40 is wound around the laminated conductor 23, thus achieving taping (Step S21). As a result, a tape-wound conductor 50 is formed.

Figure 6:
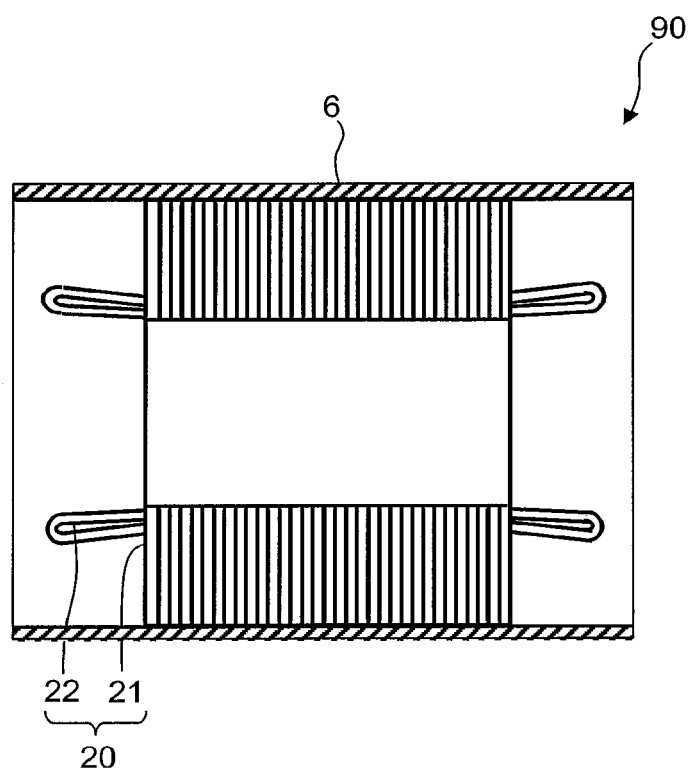
FIG. 6 is a sectional longitudinal view illustrating the configuration of a windings-incorporated object of the rotating electrical machine according to the first embodiment.

Then, the laminated conductor 23 is incorporated into the stator core 21 so as to be assembled into a windings-incorporated object (Step S22). FIG. 6 is a sectional longitudinal view illustrating the configuration of a windings-incorporated object of the rotating electrical machine according to the first embodiment. The windings-incorporated object 90 includes the stator core 21, the stator windings 22, and the frame 6 disposed radially outside the stator core 21 and the stator windings 22.

The stator windings 22 are formed by connecting the tape-wound conductors 50 (FIG. 2) housed in the plurality of slots (not illustrated). The slots are formed in the inner surface of the stator core 21 with circumferential intervals therebetween and extend up to the both axial ends of the stator core 21.

Figure 7:
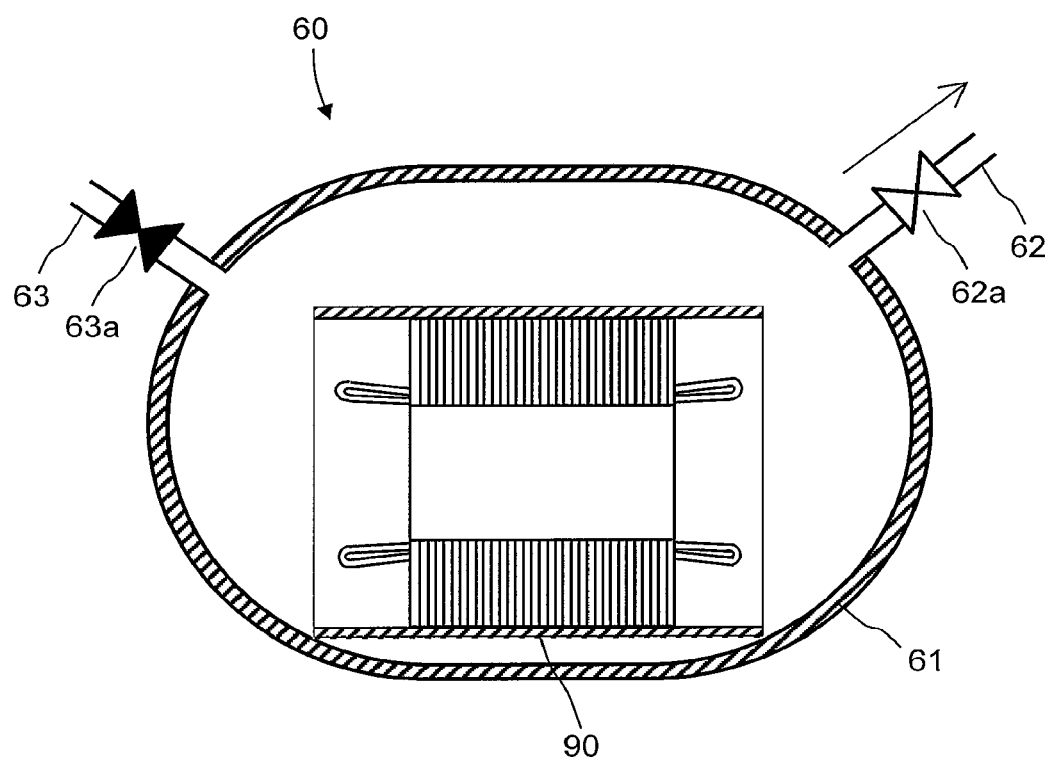
FIG. 7 is a sectional elevational view illustrating a state of vacuum drawing step in the electrical insulating structure producing method according to the first embodiment.

Then, the windings-incorporated object 90 is subjected to vacuum drawing (step S03). FIG. 7 is a sectional elevational view illustrating a state of vacuum drawing step in the electrical insulating structure producing method according to the first embodiment. Specifically, the windings-incorporated object 90 is housed in an impregnation container 61 of an impregnator 60. The impregnation container 61 can be divided into upper and lower parts, for example, so as to allow the windings-incorporated object 90 to be put in and out thereof. The divided upper and lower parts of the impregnation container 61 can be connected by not-shown flange portions.

A macromolecular polymer supply valve 63a on a macromolecular polymer supply pipe 63 and a vacuum exhaust valve 62a on a vacuum exhaust pipe 62 are closed to bring the impregnation container 61 into a sealed state. After that, the vacuum exhaust valve 62a on the vacuum exhaust pipe 62 connected to, e.g., a vacuum pump (not illustrated) is opened to draw gas in the impregnation container 61. As a result, spaces in the main insulation tape 40 of the tape-wound conductor 50 in the windings-incorporated object 90 housed in the impregnation container 61 are also subjected to vacuum drawing.

Figure 8:
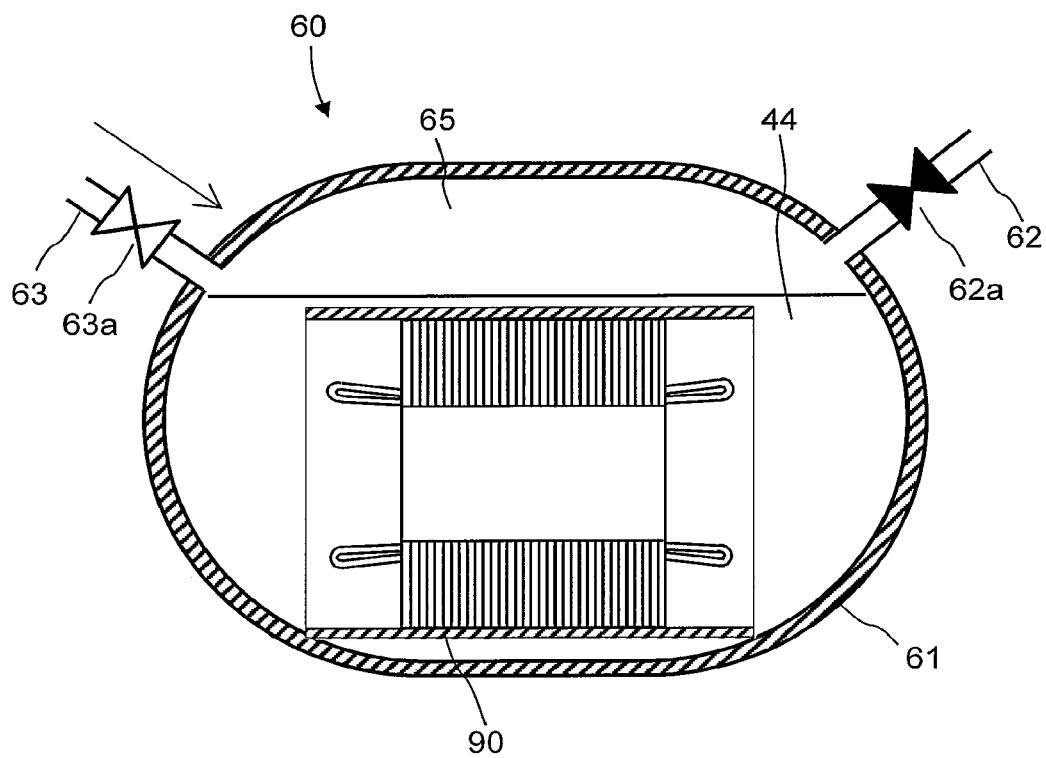
FIG. 8 is a sectional elevational view illustrating a state of injecting step of an impregnating macromolecular polymer in the electrical insulating structure producing method according to the first embodiment.

Then, an impregnating macromolecular polymer 44 with which nanoparticles have been kneaded is injected and the windings-incorporated object 90 is impregnated with it (step S03). FIG. 8 is a sectional elevational view illustrating a state of injecting step of an impregnating macromolecular polymer in the electrical insulating structure producing method according to the first embodiment. Specifically, the vacuum exhaust valve 62a on the vacuum exhaust pipe 62 is closed after the impregnation container 61 is subjected to vacuum drawing in step S03. Then, the macromolecular polymer supply valve 63a on the macromolecular polymer supply pipe 63 is opened to supply the impregnating macromolecular polymer 44 into the impregnation container 61. The impregnating macromolecular polymer 44 is supplied until the windings-incorporated object 90 is sufficiently impregnated with the impregnating macromolecular polymer 44.

When a state is reached where the windings-incorporated object 90 is sufficiently impregnated with the impregnating macromolecular polymer 44, pressurized gas 65 is supplied from the macromolecular polymer supply pipe 63 into the impregnation container 61 to pressurize the impregnation container 61. For example, inert gas having no reactivity with the impregnating macromolecular polymer 44 is used as the pressurized gas 65.

Figure 9:
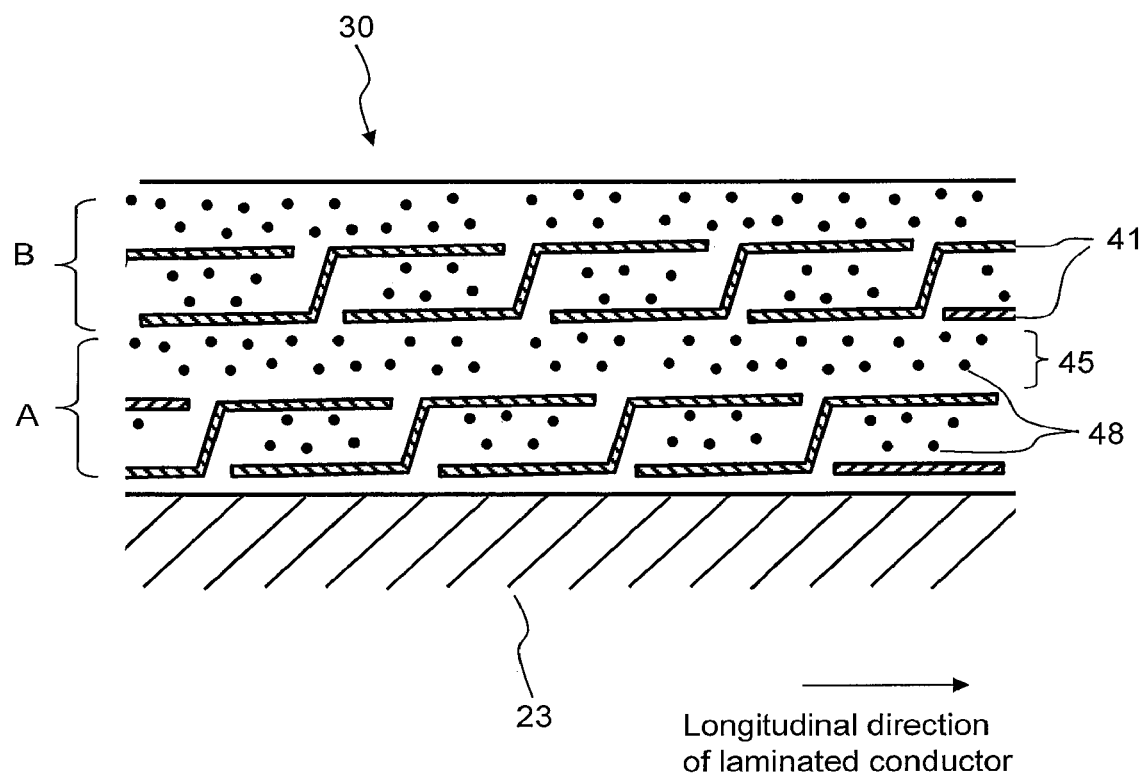
FIG. 9 is a sectional longitudinal view schematically illustrating the configuration of the insulation structure of the electrical insulating structure according to the first embodiment.

As a result, the main insulation tape 40 is impregnated with the impregnating macromolecular polymer 44 to thereby form a macromolecular polymer part 45 (FIG. 9). When the impregnating macromolecular polymer 44 permeates the main insulation tape 40, the impregnating macromolecular polymer 44 reaches and dissolves the nanoparticle-containing joining macromolecular polymer 43 and is mixed with the nanoparticle-containing joining macromolecular polymer 43. Then, the nanoparticles in the nanoparticle-containing joining macromolecular polymer 43 also spread over the main insulation tape 40 around the fiber reinforcement part where the concentration of the nanoparticles is highest.

Then, the impregnating macromolecular polymer 44 is solidified (step S25). Specifically, the windings-incorporated object 90 is taken out of the impregnation container 61, and the macromolecular polymer part 45 (FIG. 9) mainly containing the nanoparticle-containing joining macromolecular polymer 43 is solidified. When the macromolecular polymer is thermosetting resin such as epoxy resin, it is solidified by heating. When the macromolecular polymer is thermoplastic resin, it is solidified by cooling.

FIG. 9 is a sectional longitudinal view schematically illustrating the configuration of the insulation structure of the electrical insulating structure according to the first embodiment. FIG. 9 illustrates the cross-section of the laminated conductor 23 as the to-be-insulated object along the longitudinal direction. FIG. 9 shows the case where the main insulation tape 40 is wound twice (two rounds) and two taping layers A and B are formed by the first winding and by the second winding, respectively.

The electrical insulating structure 30 has the main insulation layer 41 which is the main insulating part of the main insulation tape 40 (FIG. 3), the fiber reinforcement part 42 (FIG. 3) and the macromolecular polymer part 45. The macromolecular polymer part 45 is formed by permeation of the impregnating macromolecular polymer 44 into the nanoparticle-containing joining macromolecular polymer 43 existing in the fiber reinforcement part 42 and between the fiber reinforcement part 42 and the main insulation layer 41. The macromolecular polymer part 45 is formed also outside the main insulation layer 41 by the impregnating macromolecular polymer 44 adhering in the impregnation treatment. Thus, the macromolecular polymer part 45 is integrally formed not only inside the fiber reinforcement part 42, but also on the surface of the main insulation layer 41 as illustrated in FIG. 9.

In FIG. 9 to FIG. 13, to emphasize the macromolecular polymer part 45 intruding into the fiber reinforcement part 42, the thickness of the main insulation layer 41 is shown to be extremely smaller than the actual proportion, and illustration of the fiber reinforcement part 42 is omitted.

In each of the taping layers A and B, the main insulation layers 41 disposed adjacent to each other overlap each other by half the width along the longitudinal direction of the laminated conductor 23. This is a result of the way of winding the main insulation tape 40 described above.

Nanoparticles 48 contained in the nanoparticle-containing joining macromolecular polymer 43 are scattered in the macromolecular polymer part 45 around the main insulation layer 41.

Figure 10:
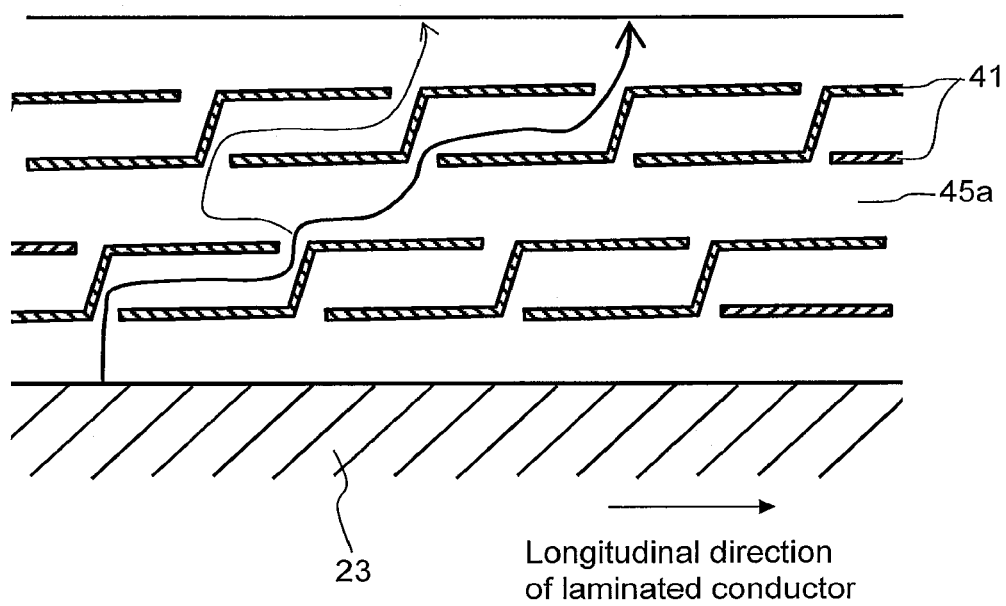
FIG. 10 is a sectional longitudinal view schematically illustrating propagation of the electric tree in the conventional insulating structure.

FIG. 10 is a sectional longitudinal view schematically illustrating propagation of the electric tree in the conventional insulating structure. The curved bold arrows schematically show the progress path of the electric tree. A macromolecular polymer part 45a does not contain the nanoparticles. The electric tree generated from the laminated conductor 23 passes the macromolecular polymer part 45a between the main insulation layers 41 in the shortest route and reaches the surface.

Figure 11:
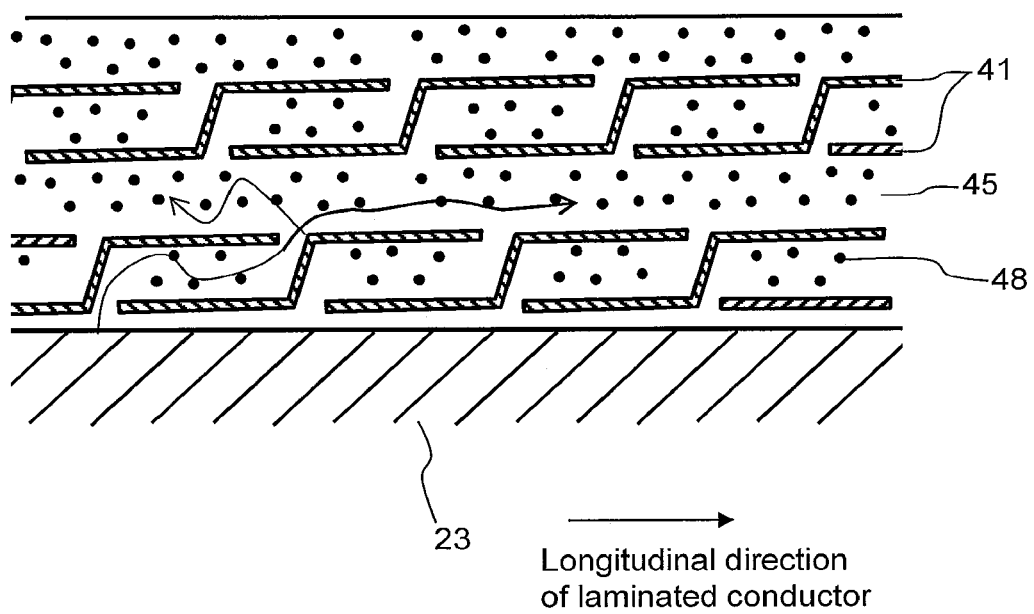
FIG. 11 is a sectional longitudinal view schematically illustrating an effect of the electrical insulating structure according to the first embodiment.

FIG. 11 is a sectional longitudinal view schematically illustrating an effect of the electrical insulating structure according to the first embodiment. In the electrical insulating structure 30 according to the present embodiment, nanoparticles 48 are scattered in the macromolecular polymer parts 45 between the main insulation layers 41. Therefore, unlike the case where the electric tree progresses in the shortest route due to absence of the nanoparticles 48, the electric tree progresses while changing its direction by the existence of the nanoparticles 48. As a result, the progress speed of the electric tree is significantly reduced as compared to that in the case where the nanoparticles 48 are absent, or the progress of the electric tree is stopped on the way.

A test was performed to confirm how the electric tree progresses in the presence of the nanoparticles. The results of the test will be described below.

Figure 12:
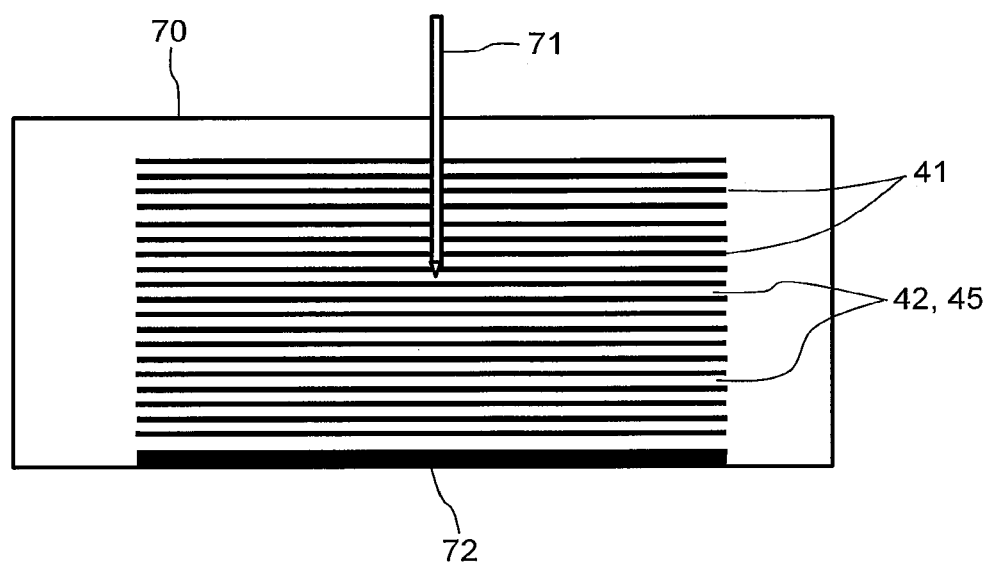
FIG. 12 is a sectional longitudinal view schematically illustrating a first test body of the electrical insulating structure according to the first embodiment.

FIG. 12 is a sectional longitudinal view schematically illustrating a first test body of the electrical insulating structure according to the first embodiment. A first test body 70 simulates a state where a plurality of mica tapes are laminated. Thus, the material of the main insulation layer 41 is mica, that of the fiber reinforcement part 42 is glass fiber, and that of the macromolecular polymer part 45 is epoxy resin. The epoxy resin does not contain the nanoparticles.

A plurality of the main insulation layers 41 are laminated so as to be almost parallel to each other. The fiber reinforcement part 42 and the macromolecular polymer part 45 are provided between the adjacent main insulation layers 41.

The thickness of each main insulation layer 41 is 100 μm to 140 μm, and the thicknesses of each layer of the fiber reinforcement part 42 and each layer of the macromolecular polymer part 45 are both 10 μm to 40 μm. However, as described above, in FIGS. 12 and 13, the thickness of the main insulation layer 41 is shown to be extremely small, and the fiber reinforcement part 42 is omitted in order to emphasize the macromolecular polymer part 45 permeating into the fiber reinforcement part 42.

A first test system was set, in which a needle electrode 71 was inserted into substantially the center position of the first test body 70 in a plan view. In this system, an alternating current of 50 Hz was applied between the needle electrode 71 and a grounding plate 72, and a partial discharge starting voltage was measured. After measuring of the partial discharge starting voltage, the applied voltage was boosted at a rate of 600 V/sec until occurrence of the dielectric breakdown of the sample.

Figure 13:
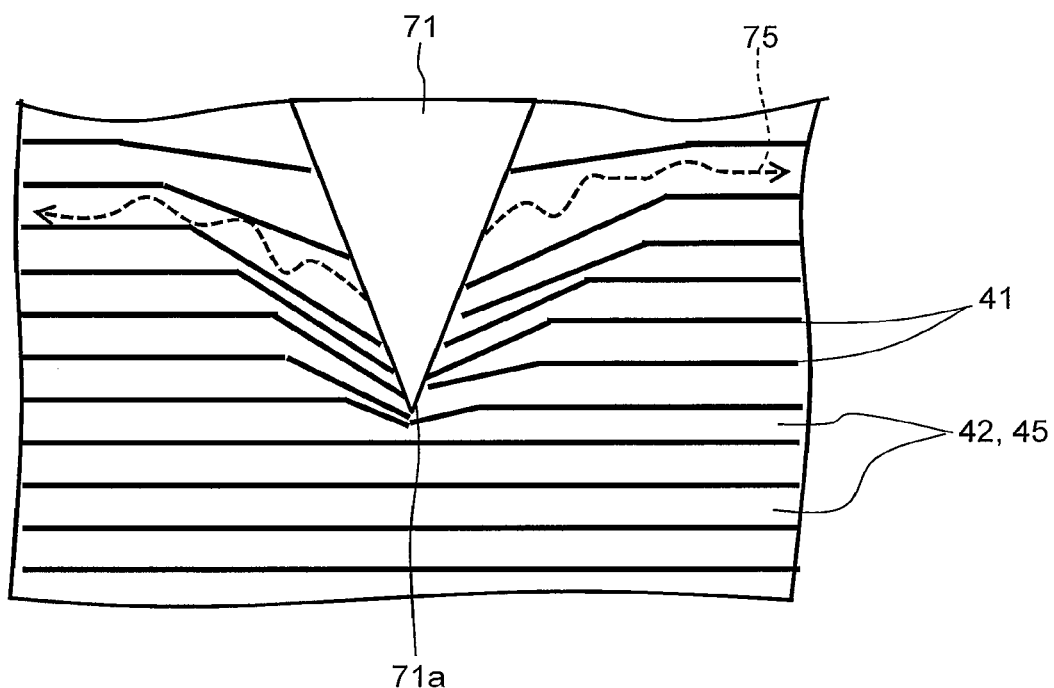
FIG. 13 is a sectional longitudinal view schematically illustrating a detail around a needle electrode as test result of the electrical insulating structure according to the first embodiment.

FIG. 13 is a sectional longitudinal view schematically illustrating a detail around a needle electrode as test result of the electrical insulating structure according to the first embodiment. As a result of the test, as denoted by the dashed arrow in FIG. 13, an electric tree 75 passes between the upper and lower main insulation layers 41 adjacent to each other and progresses in a direction where the main insulation layer 41 spreads. The electric tree 75 is generated not from a tip end part 71a of the needle electrode 71 where the strength of an electric field is the highest but from a position slightly deviated from the tip end part 71a (position slightly closer to the root side of the needle electrode 71 than to the tip end part 71a of FIG. 12). The electric tree 75 progresses while spreading in a direction where the main insulation layer 41 spreads.

The results of the test in the first test system using the first test body 70 reveal that a resin part in the fiber reinforcement part 42 between the adjacent main insulation layers 41 is weak.

Figure 14:
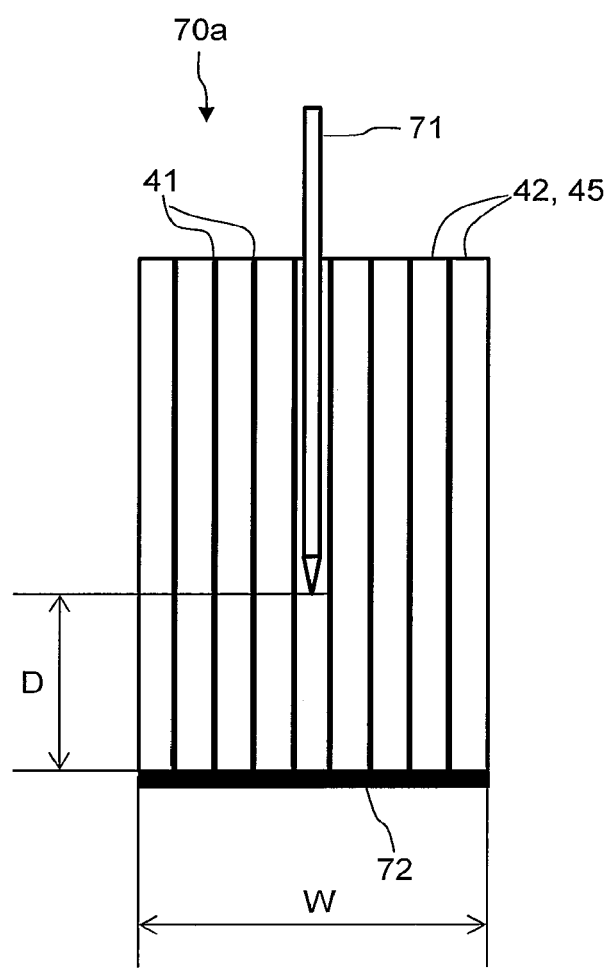
FIG. 14 is a sectional longitudinal view schematically illustrating a second test body of the electrical insulating structure according to the first embodiment.

FIG. 14 is a sectional longitudinal view schematically illustrating a second test body of the electrical insulating structure according to the first embodiment. Following the test results obtained by the first test body, the test was performed, for a case where the nanoparticles were absent in the macromolecular polymer part 45 and other case where the nanoparticles were present, with the needle electrode inserted into the fiber reinforcement part 42 between the adjacent main insulation layers 41.

Similarly to the first test body 70, a second test body 70a simulates a state where a plurality of mica tapes are laminated. The material of the main insulation layer 41 is mica, that of the fiber reinforcement part 42 is glass fiber, and that of the macromolecular polymer part 45 is epoxy resin. The epoxy resin contains the nanoparticles in some cases and does not contain them in the other cases.

A plurality of the main insulation layers 41 are laminated so as to be almost parallel to each other. The fiber reinforcement part 42 and the macromolecular polymer part 45 are disposed between the adjacent main insulation layers 41. The grounding plate 72 is disposed at the end portions of the main insulation layer 41 and the fiber reinforcement part 42. The needle electrode 71 is inserted into an area including the fiber reinforcement part 42 and the macromolecular polymer part 45 between the adjacent main insulation layers 41. The width W of the grounding plate 72 is about 4 mm, and the depth thereof is about 25 mm. The distance D between the needle electrode 71 and the grounding plate 72 is about 3 mm.

In the test, the values of the time until the occurrence of dielectric breakdown under a condition that a voltage of 15 kV are maintained after an increase in the voltage from 1 kV to 15 kV by 1 kV steps was compared between two cases. In the first case, nanoparticles were absent in the macromolecular polymer part 45. In the second case, the nanoparticles were present. In the test results, the time was about 1.9 hours in the first case where nanoparticles were absent, while the time was three weeks or more in the second case where the nanoparticles were present. In the second case, the average particle diameter of the nanoparticles was 10 nm to 20 nm, and the mixture ratio of the nanoparticles was 10 wt %.

As described above, when the nanoparticles are mixed in the macromolecular polymer part 45, electrical insulation lifetime is significantly prolonged.

Further, it is known that heat conductivity and mechanical strength increase when the nanoparticles are mixed in the macromolecular polymer part 45.

For example, the heat conductivity is, e.g., about 0.25 W/m·K when the nanoparticles are not mixed in the macromolecular polymer part 45, while it increases up to, e.g., about 0.40 W/m·K when mixed. As a result, heat radiation effect can be made higher, allowing more current to flow, which in turn can enhance electrical power density, i.e., electrical power per unit volume.

The increase in the mechanical strength eliminates the conventional need for a temporary reinforcement for fixing the windings, thereby improving efficiency of assembly work. Further, if nanoparticles are mixed with the macromolecular polymer, the viscosity of the macromolecular polymer may increase or the use lifetime of the macromolecular polymer may be shortened in some cases, depending on the combination of the nanoparticles and macromolecular polymer. However, the nanoparticles can take its effect, while suppressing increase of the viscosity and decrease of the lifetime of the macromolecular polymer.

In this embodiment as described above, the development of the electric tree can be suppressed in the insulation structure, and further the electrical power can be increased and the assembling efficiency can be enhanced. Moreover, even if the case where impregnation with nanoparticles in high concentration is difficult, the macromolecular polymer containing the nanoparticles can be directly applied. The nanoparticles can therefore be applied in any desirable concentration in this embodiment.

Second Embodiment

Figure 15:
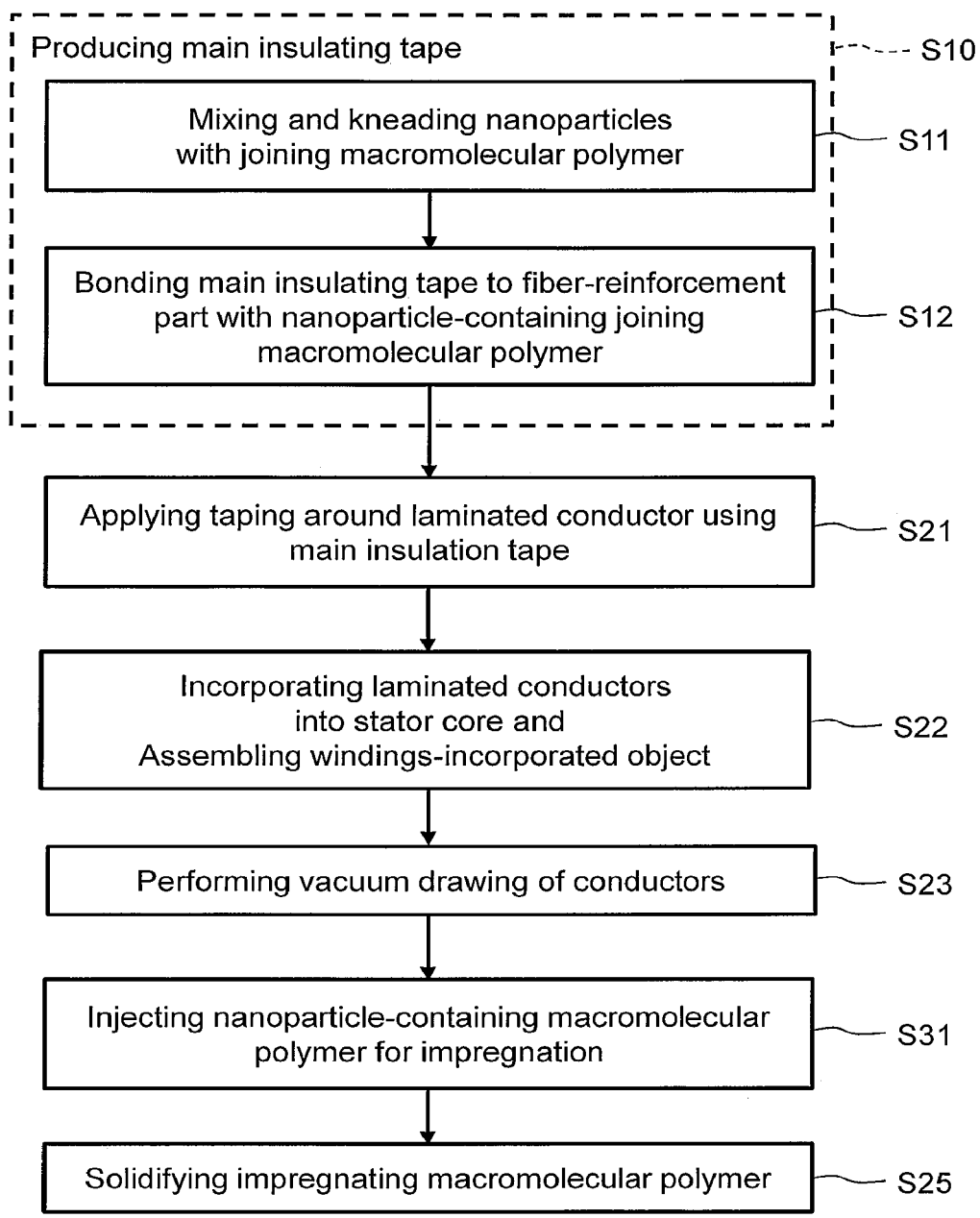
FIG. 15 is a flowchart illustrating the procedure of an electrical insulating structure producing method according to a second embodiment.

FIG. 15 is a flowchart illustrating the procedure of an electrical insulating structure producing method according to a second embodiment. This embodiment is a modification of the first embodiment. In this embodiment, instead of Step S24 of the first embodiment of forcedly applying the macromolecular polymer for use in impregnation, the macromolecular polymer for use in impregnation containing nanoparticles or mixed and kneaded with nanoparticles is injected (Step S31). In other respect, the second embodiment is identical to the first embodiment.

Figure 16:
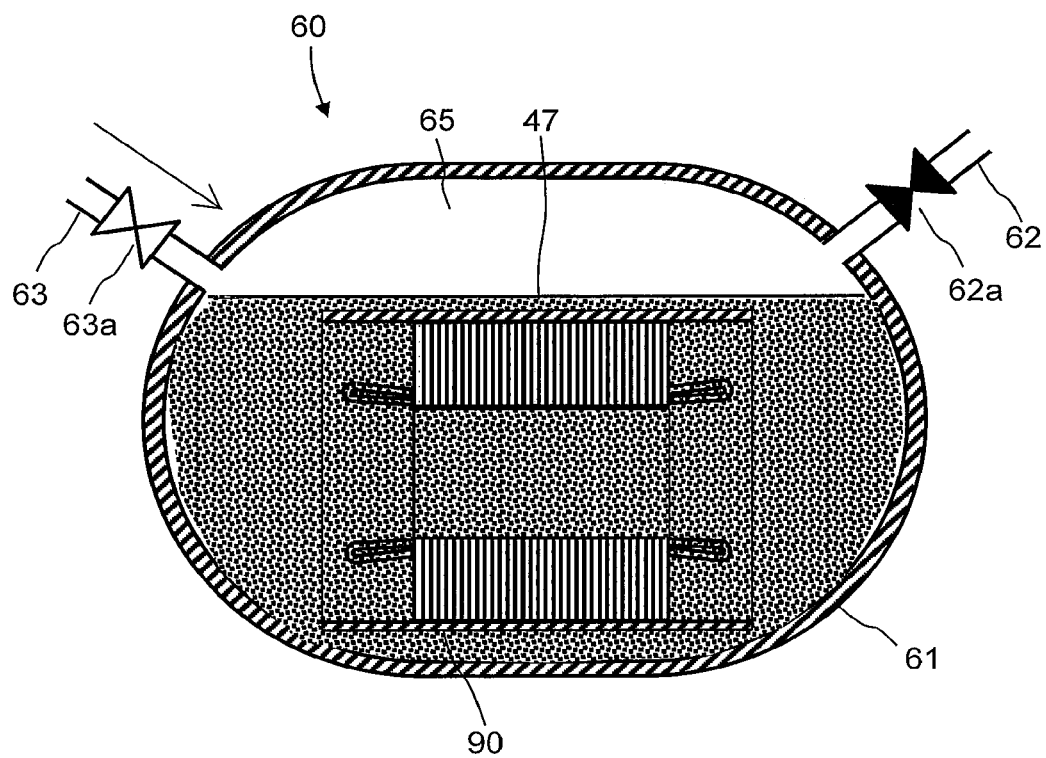
FIG. 16 is a sectional elevational view illustrating a state of injecting step of an impregnating macromolecular polymer in the electrical insulating structure producing method according to the second embodiment.

FIG. 16 is a sectional elevational view illustrating a state of injecting step of a nanoparticle-containing impregnating macromolecular polymer in the electrical insulating structure producing method according to the second embodiment. After Step S23 in which a vessel 61 of the impregnation apparatus 60 has been evacuated, the windings-incorporated object 90 is immersed in a nanoparticle-containing impregnating macromolecular polymer 47 for use in impregnation that contains the nanoparticles. In this case, the nanoparticles in the nanoparticle-containing impregnating macromolecular polymer 47 may be used in concentration different to the concentration in the nanoparticle-containing macromolecular polymer 43 for use in bonding. The combination of these concentrations can achieve an optimal nanoparticle-concentration distribution.

Thereafter, the vessel 61 is pressurized, forcing the nanoparticle-containing impregnating macromolecular polymer 47 into the tape-wound conductor 50 disposed in the windings-incorporated object 90.

The nanoparticles are thereby contained not only in the nanoparticle-containing joining macromolecular polymer 43, but also in the nanoparticle-containing impregnating macromolecular polymer 47. The nanoparticles can therefore be dispersed well. As a result of this, the advantage of the first embodiment can be more surely attained.

Other Embodiments

While the embodiment of the present inventions has been described, the embodiment has been presented by way of example only, and is not intended to limit the scope of the invention. For example, although the main insulation tape is wound by the half-wrap method in the above embodiment, the present invention is not limited thereto. For example, a winding method in which the end portions of the main insulation tape are adjacent in the longitudinal direction may be adopted.

Furthermore, the above-described embodiments may be put to use in various different ways and, if appropriate, any of the components thereof may be omitted, replaced or altered in various different ways without departing from the spirit and scope of the invention.

Therefore, all the above-described embodiments and the modifications made to them are within the spirit and scope of the present invention, which is specifically defined by the appended claims, as well as their equivalents.

What is claimed is:

1. An electrical insulating structure producing method that covers an outer surface of a to-be-insulated object, the method comprising:
    a tape production step of producing a main insulation tape by using a nanoparticle-containing joining macromolecular polymer, the tape production step including a joining macromolecular polymer producing step and a bonding step, the joining macromolecular polymer producing step being mixing and kneading a joining macromolecular polymer and the nanoparticles to produce the nanoparticle-containing joining macromolecular polymer, and the bonding step being bonding a tape-shaped main insulating layer to a tape-shaped fiber-reinforcement part, by using the nanoparticle-containing joining macromolecular polymer to produce a main insulating tape containing the nanoparticles;
    a taping step of winding a main insulation tape on outside of the to-be-insulated object to form a main insulated part;
    a vacuum drawing step, which is performed after the taping step, of vacuum drawing the tape-wound to-be-insulated object; and
    an impregnation step, which is performed after the vacuum drawing step, of injecting a impregnating macromolecular polymer to impregnate the main insulated part therewith and to produce a macromolecular polymer part with the nanoparticle-containing joining macromolecular polymer, wherein
    the bonding step includes
        a step of setting a lower roller of a group of the lower roller and an upper roller with its lower part immersed in the nanoparticle-containing joining macromolecular polymer stored in a bonding agent container, and
        a step of transferring the tape-shaped main insulating layer and the tape-shaped fiber-reinforcement part with tape-shaped main insulating layer and the upper roller contacting each other and with the tape-shaped fiber-reinforcement part and the lower roller contacting each other, thereby applying the nanoparticle-containing joining macromolecular polymer to the tape-shaped fiber-reinforcement part and bonding the tape-shaped main insulating layer and the tape-shaped fiber-reinforcement part.

2. The electrical insulating structure producing method according to claim 1, wherein
    the to-be-insulated object is a laminated conductor for stator windings of a rotating electrical machine,
    the method further comprises, after the taping step and before the vacuum drawing step, an assembly step of incorporating the tape-wound laminated conductor into a stator to assemble a windings-incorporated object, and
    the vacuum drawing step vacuums the windings-incorporated object to hereby vacuum the tape-wound to-be-insulated object to be insulated.

3. The electrical insulating structure producing method according to claim 1, wherein
    in the taping step, the main insulation tape is wound by a half-wrap method of overlapping each turn of the tape by half width of the tape.

4. The electrical insulating structure producing method according to claim 1, wherein
    in the impregnation step, the impregnating macromolecular polymer includes nanoparticles kneaded therewithin.

5. The electrical insulating structure producing method according to claim 1, wherein
    the nanoparticles are at least one of silicon dioxide, aluminum oxide, magnesium oxide, and boron nitrides.

* * * * *